US006755251B2

(12) United States Patent
Thomas et al.

(10) Patent No.: US 6,755,251 B2
(45) Date of Patent: Jun. 29, 2004

(54) DOWNHOLE GAS SEPARATION METHOD AND SYSTEM

(75) Inventors: Eugene R. Thomas, Houston, TX (US); Thomas A. Paulley, Houston, TX (US); Donald J. Victory, Sugar Land, TX (US); Harry W. Deckman, Clinton, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 37 days.

(21) Appl. No.: 10/234,907

(22) Filed: Sep. 4, 2002

(65) Prior Publication Data

US 2003/0047310 A1 Mar. 13, 2003

Related U.S. Application Data

(60) Provisional application No. 60/318,080, filed on Sep. 7, 2001, provisional application No. 60/318,087, filed on Sep. 7, 2001, and provisional application No. 60/318,085, filed on Sep. 7, 2001.

(51) Int. Cl.$^7$ .......................... E21B 43/08; E21B 43/38
(52) U.S. Cl. ..................... 166/265; 166/266; 166/227
(58) Field of Search ................ 166/265, 266, 166/276, 305.1, 306, 369, 370, 227

(56) References Cited

U.S. PATENT DOCUMENTS

| | | | |
|---|---|---|---|
| 3,215,198 A | 11/1965 | Willman | 166/9 |
| 4,171,017 A | 10/1979 | Klass | 166/266 |
| 4,241,787 A | 12/1980 | Price | 166/105 |
| 4,296,810 A | 10/1981 | Price | 166/265 |
| 4,393,936 A | 7/1983 | Josendal | 166/263 |
| 4,635,721 A | 1/1987 | Sheffield et al. | 166/268 |
| 4,824,447 A | 4/1989 | Goldsberry | 55/158 |
| 5,267,614 A | 12/1993 | Northrop | 166/270 |
| 5,326,458 A | 7/1994 | Johnson | 210/122 |
| 5,340,382 A | * 8/1994 | Beard | 95/151 |
| 5,425,416 A | 6/1995 | Hammeke et al. | 166/105.5 |
| 5,673,752 A | 10/1997 | Scudder et al. | 166/265 |
| 5,693,225 A | 12/1997 | Lee | 210/512.2 |
| 5,730,871 A | 3/1998 | Kennedy et al. | 210/512.2 |
| 5,860,476 A | 1/1999 | Kjos | 166/265 |
| 5,913,363 A | 6/1999 | Paplinski | 166/265 |
| 5,961,841 A | 10/1999 | Bowers | 210/739 |
| 6,015,011 A | 1/2000 | Hunter | 166/265 |
| 6,149,344 A | 11/2000 | Eaton | 405/128 |
| 6,352,111 B1 | 3/2002 | Bode et al. | 166/265 |
| 6,454,836 B1 | 9/2002 | Koelmel et al. | 95/46 |
| 6,502,635 B1 | 1/2003 | Underdown et al. | 166/267 |
| 6,543,545 B1 * | 4/2003 | Chatterji et al. | 166/381 |

FOREIGN PATENT DOCUMENTS

| | | | |
|---|---|---|---|
| WO | WO 96/30625 | 10/1996 | E21B/43/14 |
| WO | WO 00/58603 | 10/2000 | E21B/43/38 |

OTHER PUBLICATIONS

Longworth, H.L., et al., "Underground Disposal of Acid Gas in Alberta, Canada: Regulatory Concerns and Case Histories", Society of Petroleum Engineers, SPE No. 35584, Gas Technology Conference, Calgary, Alberta, pp. 181–188, Apr. 28—May 1, 1996.

Nieck Edwin Benes, Dissertation entitled "Mass Transport in Thin Supported Silica Membranes", Dec. 21, 2000.

* cited by examiner

Primary Examiner—Frank Tsay (57) ABSTRACT

The invention is a method and system of separating a multi-component fluid in a wellbore. At least one fluid separation membrane comprising a feed side and a permeate side is incorporated in the wellbore. A flowing stream of the multi-component fluid obtained from a subterranean zone being in fluid communication with the wellbore is passed across the feed side of the membrane at a first pressure. A retentate stream depleted in at least one component compared to the multi-component fluid is withdrawn from the feed side of the membrane and passed to the earth's surface. A permeate stream at a second pressure is withdrawn from the permeate side, in which the permeate stream is enriched in at least one component compared with the multi-component fluid. The second pressure is controlled to maintain the second pressure below the first pressure.

40 Claims, 5 Drawing Sheets

DOWNHOLE GAS SEPARATION METHOD AND SYSTEM

CROSS REFERENCE TO RELATED APPLICATION

This application claims the benefit of U.S. Provisional Patent Application Nos. 60/318,080 filed Sep. 7, 2001. The application is related to co-pending provisional patent application Nos. 60/318,087 and 60/318,085 both filed on Sep. 7, 2001.

FIELD OF THE INVENTION

This invention relates to a method and system for separating components of a multi-component fluid mixture in a well. More specifically the invention relates to a method and system for separating components of a multi-component gas in a wellbore using a gas separation membrane.

BACKGROUND OF THE INVENTION

Natural gas is an important fuel gas and it is used extensively as a basic raw material in the petrochemical and other chemical process industries. The composition of natural gas varies widely from field to field. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. Removal of acid gases from natural gas produced in remote locations is desirable to provide conditioned or sweet, dry natural gas either for delivery to a pipeline, natural gas liquids recovery, helium recovery, conversion to liquefied natural gas (LNG), or for subsequent nitrogen rejection. $H_2S$ is removed because it is toxic in minute amounts and it is corrosive in the presence of water through the formation of hydrosulfurous acid. Upon combustion, $H_2S$ forms sulfur dioxide, a toxic and corrosive compound. $CO_2$ is also corrosive in the presence of water, and it can form dry ice, hydrates and can cause freeze-up problems in pipelines and in cryogenic equipment often used in processing the natural gas. Also, by not contributing to the heating value, $CO_2$ merely adds to the cost of gas transmission.

An important aspect of any natural gas treating process is economics. Natural gas is typically treated in high volumes, making even slight differences in capital and operating costs of the treating unit very significant factors in the selection of process technology. Some natural gas resources are now uneconomical to produce because of processing costs. There is a continuing need for improved natural gas treating processes that have high reliability and represent simplicity of operation.

A number of processes for the recovery or removal of $CO_2$ from natural gas have been proposed and practiced on a commercial scale. The processes vary widely, but generally involve some form of solvent absorption, adsorption on a porous adsorbent, or diffusion through a semipermeable membrane. The use of membranes for gas separation is becoming increasingly more common because of its simplicity.

In a membrane separation system, a mixture of gases, the feed gas, under pressure, is passed across the surface of a membrane that acts as a selective barrier, permitting some components of the gas mixture to pass through more readily than other components. The pressure on the feed side of the system is maintained at a level sufficiently higher than the pressure on the permeate side of the membrane to provide a driving force for the diffusion of the more permeable components of the gaseous mixture through the membrane. The partial pressure of the more permeable gaseous components is also maintained at a higher level on the feed side of the membrane than on the permeate side by constantly removing both the permeate stream and the residue of the feed stream, the retentate stream, from contact with the membrane. While the permeate stream can represent the desired product, in most natural gas permeation processes the desired product is the residue stream, and the permeate stream consists of contaminants which are removed from the feed stream.

Membranes have been proposed for use in wellbores to separate fluids, including for example U.S. Pat. No. 6,015,011 (Hunter); U.S. Pat. No. 5,860,476 (Kjos); U.S. Pat. No. 5,730,871 (Kennedy et al.); U.S. Pat. No. 5,693,225 (Lee); U.S. Pat. No. 4,241,787 (Price); and U.S. Pat. No. 4,171,017 (Klass). Membrane modules in a wellbore have been proposed primarily to separate hydrocarbons (gas or crude oil) from brine. In Lee and Kennedy et al., the hydrocarbons are passed to the earth's surface and the unwanted brine is injected into a subterranean discharge formation. Kjos proposed using wellbore membranes in combination with downhole cyclones to separate from a natural gas stream unwanted gases, including $H_2S$, $CO_2$, and $H_2O$. Kjos further proposed passing the unwanted $CO_2$ into a subterranean waste zone. One shortcoming of Kjos is that no procedure is disclosed for carrying out the membrane separation process.

A need exists for an improved gas separation method and system for economically separating one or more unwanted components from a natural gas stream.

SUMMARY

The invention is a method and system of separating a multi-component fluid in a wellbore. At least one fluid separation membrane comprising a feed side and a permeate side is incorporated in the wellbore. A flowing stream of the multi-component fluid obtained from a subterranean zone being in fluid communication with the wellbore is passed across the feed side of the membrane at a first pressure. A retentate stream depleted in at least one component compared to the multi-component fluid is withdrawn from the feed side of the membrane and passed to the earth's surface. A permeate stream at a second pressure is withdrawn from the permeate side, in which the permeate stream is enriched in at least one component compared with the multi-component fluid. The second pressure is controlled to maintain the second pressure below the first pressure.

BRIEF DESCRIPTION OF THE DRAWINGS

The invention and its advantages will be better understood by referring to the drawings, which are not drawn to scale, in which like numerals identify like parts and in which.

The drawings illustrate specific embodiments of practicing the process and system of this invention. The drawings are not intended to exclude from the scope of the invention other embodiments that are the result of normal and expected modifications of these specific embodiments.

DETAILED DESCRIPTION OF THE INVENTION

This invention provides an improved fluid separation system for use in a wellbore for separating one or more components of a fluid stream produced from a subterranean producing zone and disposing of all or a substantial portion of the separated components in a subterranean disposal zone. The wellbore separation is carried out by means of one or more membrane modules having a feed side and a permeate side. Fluid produced from the producing zone is passed across the feed side of the membrane module. A retentate stream depleted in one or more components is withdrawn from the feed side and passed to the earth's surface. A permeate stream enriched in the one or more components is withdrawn from the permeate side of the membrane and placed in a disposal zone. The term "enriched" as used herein refers to the concentration of a component of natural gas in relation to the concentration of that component in the feed stream. For example, the permeate stream from the membrane will be enriched in the readily permeable component relative to the concentration of the readily permeable component in the feed. The permeate, for example, may be enriched in $C_{3+}$ hydrocarbons, hydrogen sulfide, and/or carbon dioxide. The retentate may also be referred to as being "depleted" of the readily permeable component.

The differential pressure across the membrane is monitored using downhole pressure sensors or pressure sensors at the wellhead to ensure that the unwanted component(s) flow through the membrane at a desired rate. The method of this invention can reduce the volume of produced fluids lifted to and handled at the ground surface, resulting in a lowering of the power requirements to operate and treat the natural gas. The basic steps of this separation method are illustrated in simple form in FIG. 1.

Figure 1:
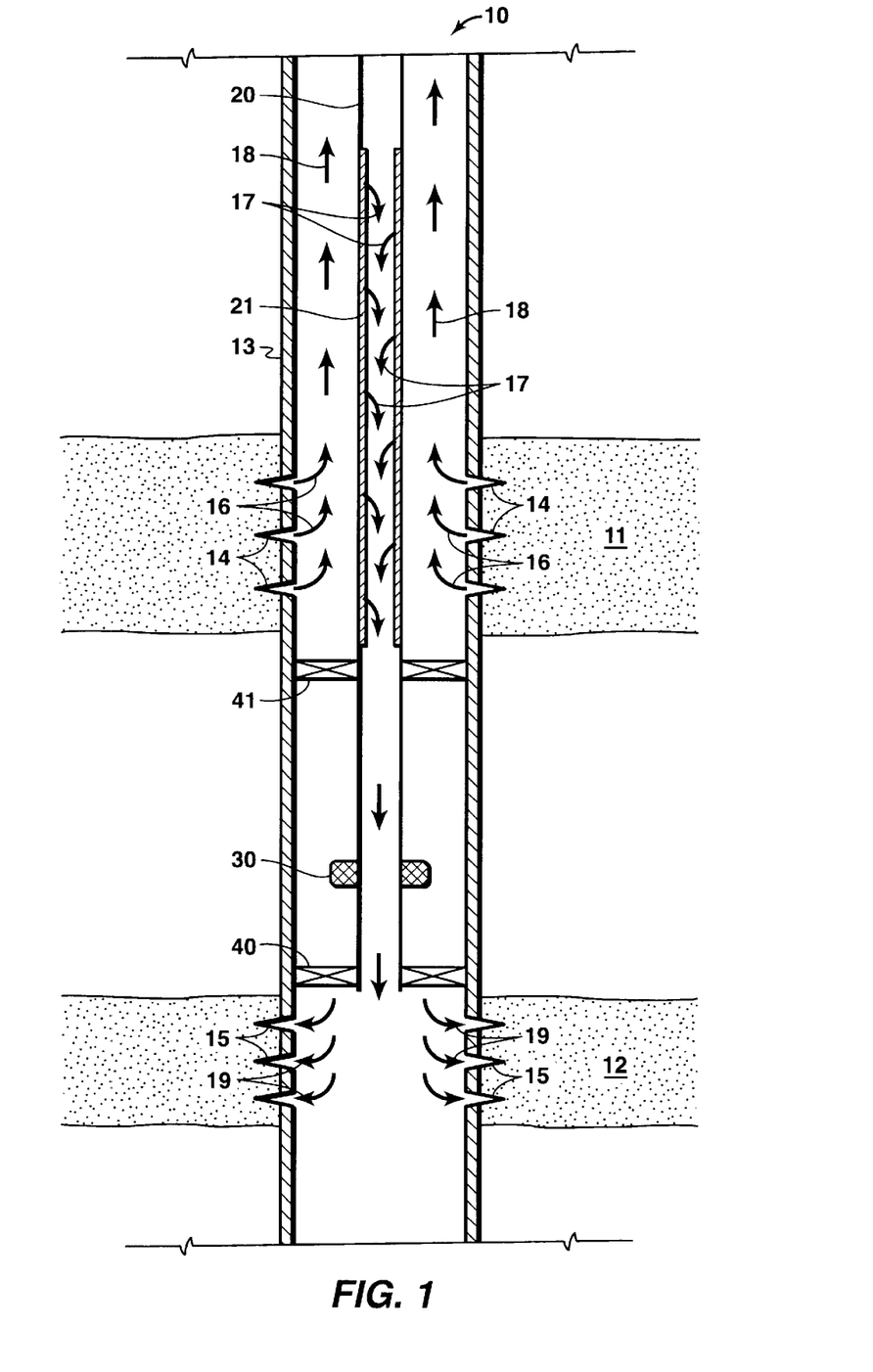
FIG. 1 is a schematic side-elevation sectional view of one embodiment of the invention showing production of formation gas from one formation and injection of waste gas into a separate, lower formation.

Referring to FIG. 1, there is schematically illustrated, in side elevation sectional representation, one embodiment of the invention. A production well 10, which has been drilled by conventional techniques, is shown formed through at least one production zone 11 and at least one disposal zone 12. The well has an elongated tubing production casing 13 extending downwardly from the earth's surface (not shown) through the production zone 11 and to the lower disposal zone 12. The casing is cemented in place and is pierced by a plurality of production perforations 14 adjacent to the production zone 11 and a plurality of injection perforations 15 adjacent to the disposal zone 12 to establish fluid communication between the respective formations 11 and 12 and the interior of the production casing 13. The perforations 14 and 15 are formed in the casing by conventional perforation techniques. A tubing string 20 is hung inside the casing 13, and extends to the top of the disposal zone 12. The production zone 11 produces natural gas (arrows 16) into the interior of casing 13. One or more membrane modules 21 are incorporated into the tubing string 20.

Natural gas (arrows 16) flows upwardly in the annular space formed between tubing string 20 and the inside wall of casing 13. The membrane selectively permits one or more components of the natural gas, such as $CO_2$, to pass to the interior of tubing string 20. The $CO_2$-enriched permeate stream (arrows 17) is passed to pump or compressor 30. Pump or compressor 30 can be any suitable pumping system for pressurizing the permeate to a selected pressure to cause the pressurized permeate (arrows 19) to flow through injection perforations 15 into disposal zone 12. Preferably, pump or compressor 30 is a submersible electrically driven, multistage pump system, but it may be a hydraulic pump, or an eductor-type pump.

One or more wellbore isolation or sealing devices are used to prevent the permeate stream that exits the lower end of tubing string 20 from mixing with the production fluid being produced from production zone 11. These wellbore isolation or sealing devices are commonly referred to as wellbore packers and are located in at least one location between the production zone 11 and the disposal zone 12. Two packers 40 and 41 are illustrated in FIG. 1, which can be any suitable commercially available retrievable or permanent packers with inflatable or compressible elastomeric sealing elements, as is well known to those skilled in the art. One of the packers may also be included on the exterior of the pump or compressor 30.

As is apparent to one skilled in the art, there may be a plurality of production zones and a plurality of disposal zones in accordance with this invention. Each disposal zone may be in the same geological formation as a production zone. For example, gas injection may be used to maintain pressure in an oil-production zone. Alternatively, one or more disposal zones may be in a different and distinct geological formation from each production zone. For example, a gas disposal zone may be for the purpose of gas storage.

Any suitable scheme can be used for isolating the production zone and the disposal zone from each other. As an alternative, instead of using casing below packer 40, the $CO_2$ may be injected directly into an open hole (not shown) within the subterranean strata. Another alternative would be to use a multi-lateral type well design where the production zone and disposal zones are in separate legs of the multi-lateral system. The one or more producing zones may be above or below one or more disposal zones, and the producing zone and the disposal zone may be separated by one or more other zones. Moreover, the disposal zone can be the same as the production zone provided that the production zone and the disposal zone do not communicate actively. The $CO_2$ may, for example, be injected into the lower end portion of the production zone, and the heavy $CO_2$ will tend to remain in the lower portion of the production zone and not be produced. Keeping the $CO_2$ in the subsurface may also be beneficial in other ways. In some locations, there are increasingly strict limitations on the emission of separated gases into the atmosphere, including the imposition of a tax on carbon emissions. These limitations and taxes may increase the cost of producing gas resources substantially.

The pressure on the permeate side of membrane module 21 and the pressure on the feed side of the membrane can be separately and independently varied and controlled by various techniques involving the downhole pump and the wellbore itself. For example, the pressure on the permeate side of membrane module 21 can be controlled by regulating the flow rate of gas through pump or compressor 30 or by fixing the speed of the pump or compressor 30. The differential pressure across the membrane module 21 typically depends on many factors, such as the particular membrane used, the flow rate of the permeate discharge pump or compressor 30, and the capacity of the discharge pump or compressor 30. In addition, the pressure on the feed side of the membrane may be controlled by controlling the flowing wellhead pressure on the feed side. For situations where the permeate is returned to the surface, the flowing wellhead pressure of the permeate side could also be controlled. A differential pressure of at least 100 psi (690 kPa) is preferred since a lower differential pressure may require more membrane surface area to achieve a desired flux rate through the membrane module 21. If the pressure differential between the feed pressure and the permeate pressure is less than about 100 psi (690 kPa), the permeate pressure can be reduced by increasing the flow rate of gas through compressor 30.

The retentate (arrows 18) is conveyed to the earth's surface for further treatment by well-known techniques.

While the gas production well is shown in FIG. 1 as a well that extends vertically into the gas production zone, it may alternatively be curved to extend at an angle into the formation, and it may also have at least one section that extends horizontally into the formation. Such variations are well known to those skilled in the art for production of gas from subterranean formations.

The membrane module 21 used in the wellbore 10 is preferably tubular in design. Which sides of the membrane will be the permeate side and the feed side will depend on the flow conduit configuration in the wellbore. In FIG. 1, the flow configuration illustrates an example in which the interior of the membrane module is the permeate side and the exterior is the feed side. However, other configurations within the scope of this invention may reverse the sides. One example that illustrates such a reversal is depicted in FIG. 2.

Figure 2:
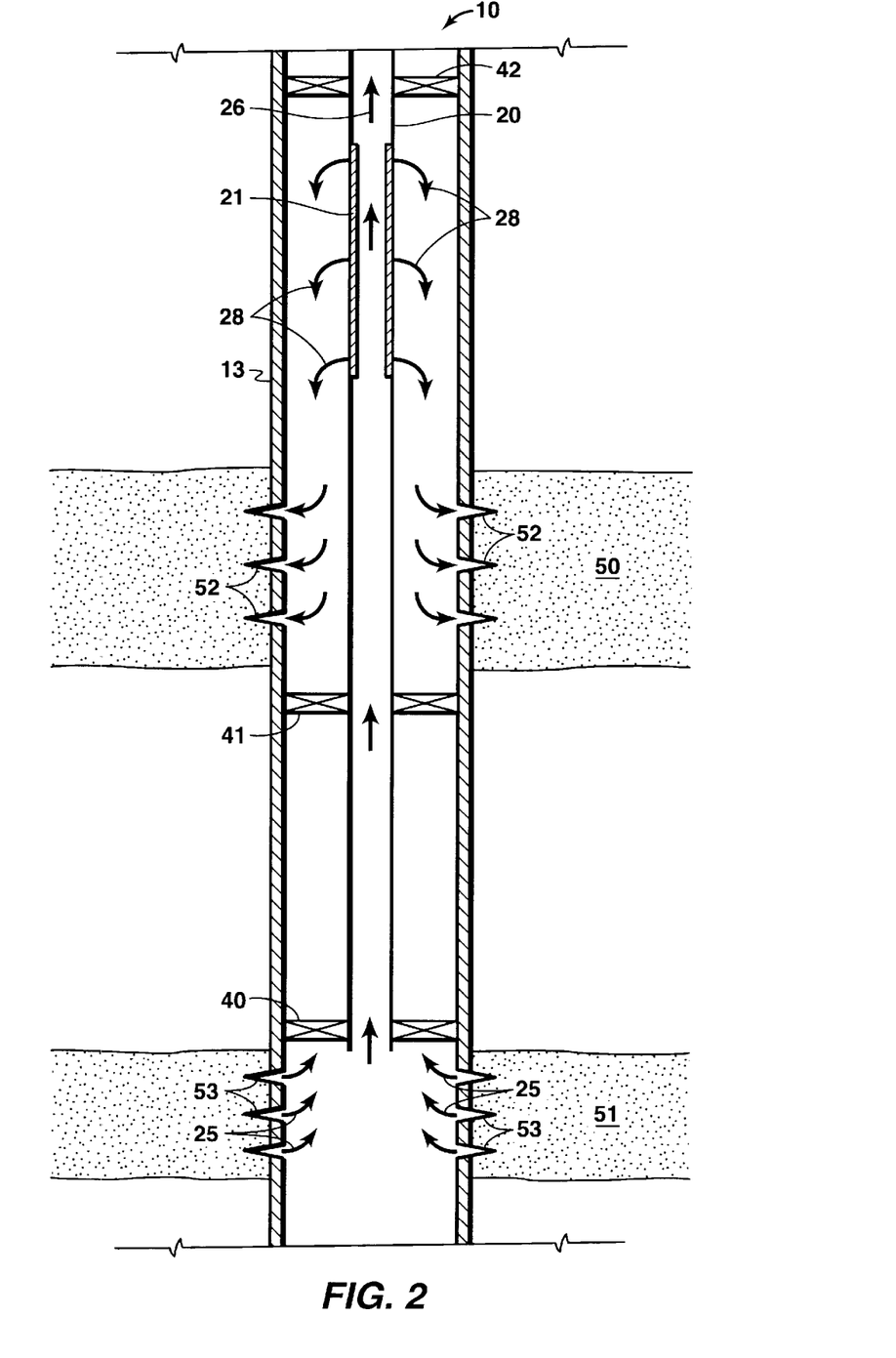
FIG. 2 is a schematic side-elevation sectional view of a second embodiment of the invention showing production of formation gas from one formation and injection of waste gas into a separate, upper formation.

FIG. 2 schematically illustrates, in side elevation sectional representation, a second embodiment of the invention. In this embodiment, a disposal zone 50 is located above a producing zone 51. Natural gas (arrows 25) from the producing zone 51 passes into the interior of the casing 13 through perforations 53 and enters the lower end of tubing string 20. To prevent fluid communication between disposal zone 50 and producing zone 51, packers 40 and 41 are placed in the annular space between the tubing string 20 and casing 13, with packer 40 located near the top of producing zone 51 and packer 41 located near the bottom of the disposal zone 50.

One or more membrane modules are incorporated into the tubing string 20, with only one membrane module 21 being depicted in FIG. 2. As the natural gas (arrows 26) flows through the interior of membrane module 21, the pressure of the natural gas is sufficiently higher than the pressure on the permeate side of the membrane to provide a driving force for the diffusion of the more permeable components of the natural gas mixture to pass through the membrane and into the annular space between the tubing string 20 and the casing 13.

In FIG. 2, the permeate gas is shown as flowing through casing perforations 52 into disposal zone 50. Since the disposal zone 50 has a higher elevation than producing zone 51, the pressure in disposal zone would typically be lower than the pressure in producing zone 51, thus providing a driving force for the permeate to enter disposal zone 50 without the need for further pressurization of the permeate. However, if the pressure in disposal zone 50 is close to or higher than the pressure of the producing zone, or to increase the flux rate through the membrane module 21, it may be desirable to provide a conventional in-situ pump or compressor (not shown) that withdraws permeate from the permeate side of the membrane module 21 and increases the discharge pressure of the permeate to promote flow into disposal zone 50.

A packer 42 is preferably located above membrane module 21 to prevent the permeate from entering the annular space between tubing string 20 and the casing 13 above membrane module 21.

Those skilled in the art will recognize that if the retentate (arrow 26) does not have sufficient velocity to rise to the surface of the wellbore 10, any form of conventional pump or compressor (not shown) may be mounted within the wellbore to pressurize the retentate to a higher pressure. Such upward pumping or compressing apparatus is entirely conventional and forms no part of the invention.

Membrane module 21 is preferably connected in series with sections of a tubing string 20 that is inserted into wellbore 10. One or more membrane modules can be installed at any desired location in the string and the membrane modules may comprise substantially the entire length of the tubing string. Usually the lower-most membrane module will be positioned adjacent to or somewhat above the producing zone. However, it may also be desirable for some applications to have the lowermost membrane module substantially above the disposal zone, to maximize the pressure differential across the membrane and to minimize the pump horsepower required to place the $CO_2$ into the disposal zone. By having the membrane module 21 high in the wellbore, a greater amount of pressure recovery on the permeate side may be achieved due to the larger hydrostatic head of the fluid column.

A plurality of membrane modules, in series or in parallel (not shown in the drawings), may be connected directly with one another or separated by one or more tubing sections or other downhole equipment. The number of membrane modules and the locations of the modules within the tubing string 20 can be optimized for a particular application by those skilled in the art taking into account the teachings of this description, the natural gas composition and flow rate from the producing zone 51, the temperatures and pressure of the producing zone 51 and disposal zone 50, and the type or types of membranes used.

Figure 3:
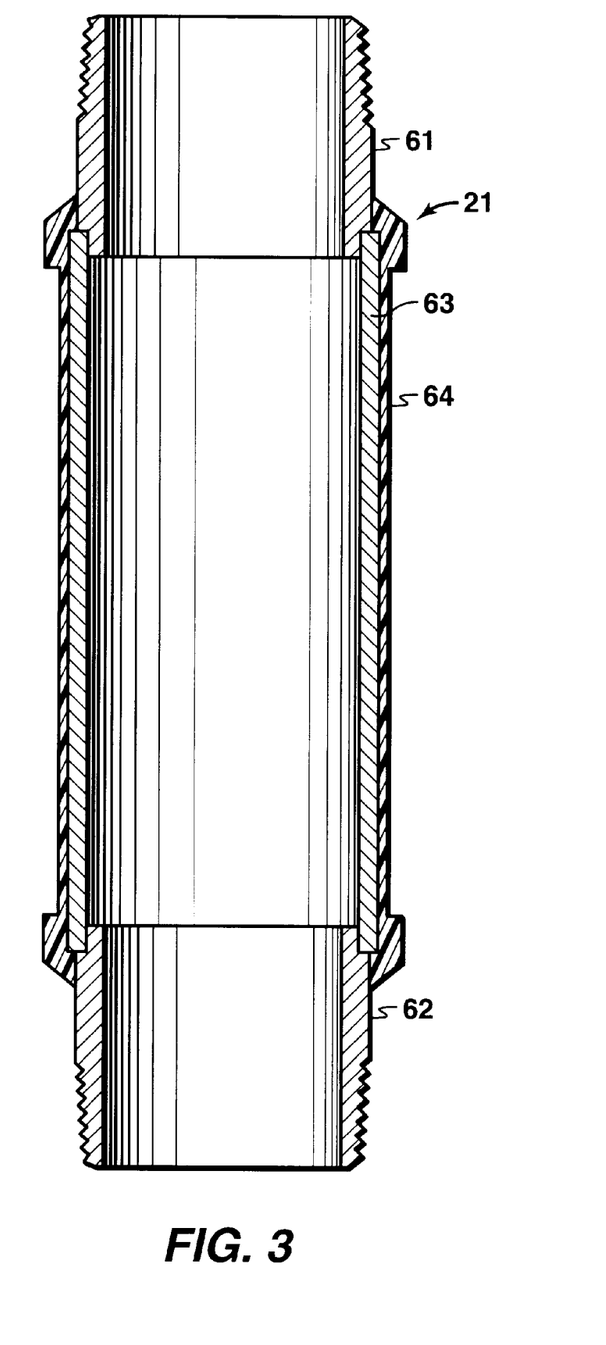
FIG. 3 is a vertical section elevational view of one embodiment of a membrane used in the invention.

FIG. 3 illustrates in vertical sectional representation one example of a membrane module 21 that can be used in the embodiment shown in FIG. 1. Membrane module 21 is designed to be threaded into a conventional production tubing string 20. A conventional production tubing string 20 typically comprises sections of tubing that are connected together with fluid-tight seals to form a conduit for production of reservoir fluids to the surface. The tubing string typically uses threaded connections to connect the tubing sections. Each tubing connection usually has at least one tapered exteriorly-threaded end called a "pin" and a relatively short coupling with two interiorly-threaded ends called "boxes". The pin section is inserted into the box and the "connection" thus made is assembled in a rotational manner, or "made-up", to effectively connect the tubing sections and seal the connection. Membrane module 21 has threaded end connectors 61 and 62 for threadedly connecting in series into an internally threaded connector box (not shown) or into a standard pipe connector for joining membrane module 21 to tubing, pumps, similar membrane modules, or various downhole equipment.

The end connectors 61 and 62 are rigidly connected to an inner support member 63 that provides rigidity to the membrane module and serves to axially transport fluid flow through the membrane module 21. The length of the support member is not critical, but the length of module 21 will preferably be approximately the same length as sections of the tubing string 20. The support member 63 is preferably a hollow, tubular member and has perforations, slits, pores, or the like in its peripheral wall that permits fluid flow into or out from the hollow center. A non-limiting example of a support member 63 is a thin, porous metallic material. The support member 63 need not be hollow as long as it is capable of transporting permeate axially through the membrane module 21 with a minimum of pressure reduction. Preferably, the openings or pores in the support member 63 make substantially no contribution to the overall pressure drop across the wall of the membrane module 21. The support member 63 may be in the form of a pipe, cage, or other shape, depending upon the strength required of it in a particular application and on the type or types of membrane used.

For reasons of strength, support member 63 is usually cylindrical, but other shapes may be used, such as polygonal or oval cross sections, and the cross section may vary along its length. In the example illustrated in FIG. 3, the support member 63 comprises a cylindrical pipe having a uniform cross section over its length.

If membrane module 21 is used in the embodiment illustrated in FIG. 1, the natural gas would pass on the exterior of membrane module 21, and one or more of the more permeable components of the natural gas would pass through a relatively thin membrane layer 64 that is coated or bonded to the surface of support member 63.

The membrane module 21 may also include other layers not shown in the drawings, such as a protective layer, such as a wrapped layer or a cage, protecting the outside of the membrane.

The support member 63 and membrane 64 are suitably connected to end connectors 61 and 62 to ensure that any passage of fluids between the exterior and interior of the membrane module 21 must pass through the membrane. There is no particular restriction on the materials of which the end connectors 61 and 62 are made. They can be made of a wide variety of materials including but not limited to ceramics, metals, and polymeric materials. The same applies to the end connectors of a second example of a membrane module that is described later in this description.

Any suitable material may be used for the separation membrane 64. Typical membrane materials include inorganic materials, organic polymers, or organic polymers mixed with inorganics, such as fillers, reinforcements, or the like. Most current commercial membranes are prepared from organic polymers. However, many organic polymers will not tolerate the high temperature and pressure conditions typically found in wellbores. Furthermore, the functionality of many organic polymers declines in the chemical environment of typical gas-producing well. It is therefore preferred that inorganic membranes be used in the invention. Known microporous inorganic membranes include porous glass, ceramic sinters, and metal sinters. The invention is not intended to be limited to any particular membrane material or membrane type, however, and encompasses any membrane, of any material, that is capable of meeting the desired permeation properties, including, for example, homogeneous membranes, composite membranes, and membranes incorporating sorbents, carriers, or plasticizers.

Figure 4:
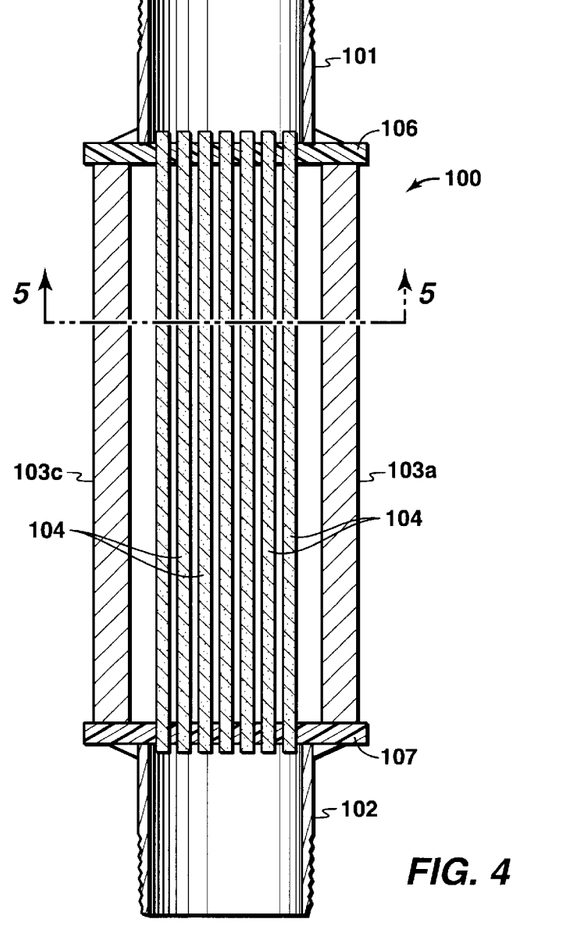
FIG. 4 is a vertical section elevational view of a second embodiment of a membrane used in the invention.
Figure 5:
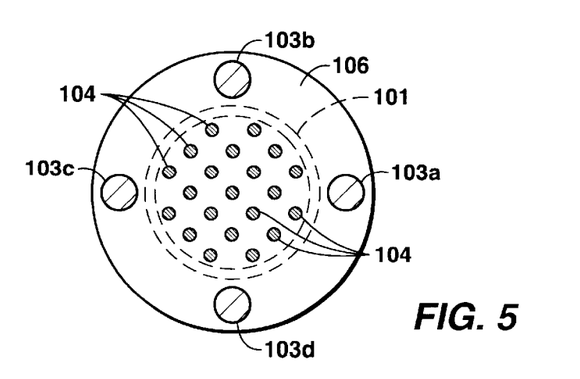
FIG. 5 is a view taken along line 5—5 of FIG. 4.

FIG. 4 illustrates in vertical sectional representation a second embodiment of a membrane module 100 that may be used in the invention. Membrane module 100, like membrane module 21 illustrated in FIG. 3, is designed to be threaded into a conventional production tubing string 20. Membrane module 100 may be used in the embodiment illustrated in FIG. 2 in which the interior of the membrane module 100 is the feed side and the membrane module's exterior is the permeate side. Threaded end connectors 101 and 102 are designed to be connected to conventional production tubing sections. The feed stream flows into the feed side which is defined by the internal wall of a bundle of tubes 104. The $CO_2$ selectively permeates through the walls of tubes 104 and into the permeate-rich space defined by the exterior of the surfaces of the tubes 104 and the internal wall of casing 13. Of course, if desired, the feed natural gas may be introduced into the space defined by the exterior of the surfaces of the tubes 104 and the internal wall of casing 13 and then the $CO_2$ would permeate through the membrane into the space defined by the interior walls of tubes 104. The bundle of tubes 104 have tubesheets 106 and 107 at the ends. The tubesheets 106 and 107 need not have any particular shape. Preferably, they have an outer periphery which is generally round, such as circular, so that there are no sharp corners that can catch on external objects as the membrane module 100 is being lowered into wellbore. The hollow tubes 104 may be arranged in a suitable manner. A nonlimiting example of one such configuration is illustrated in FIG. 5, which is a cross-sectional view along line 5—5 of FIG. 4. The end connectors 101 and 102 sealingly engage the tubesheets 106 and 107 at the ends to ensure that fluid flow between the interior of the tubes 104 and the exterior of the module 100 is only through the walls of hollow tubes 104. The tubesheets 106 and 107 are preferably connected to each other by tie-rods, such as tie-rods 103a, 103b, 103c, and 103d, to provide structural integrity to membrane module 100 for use in the wellbore environment.

Figure 6:
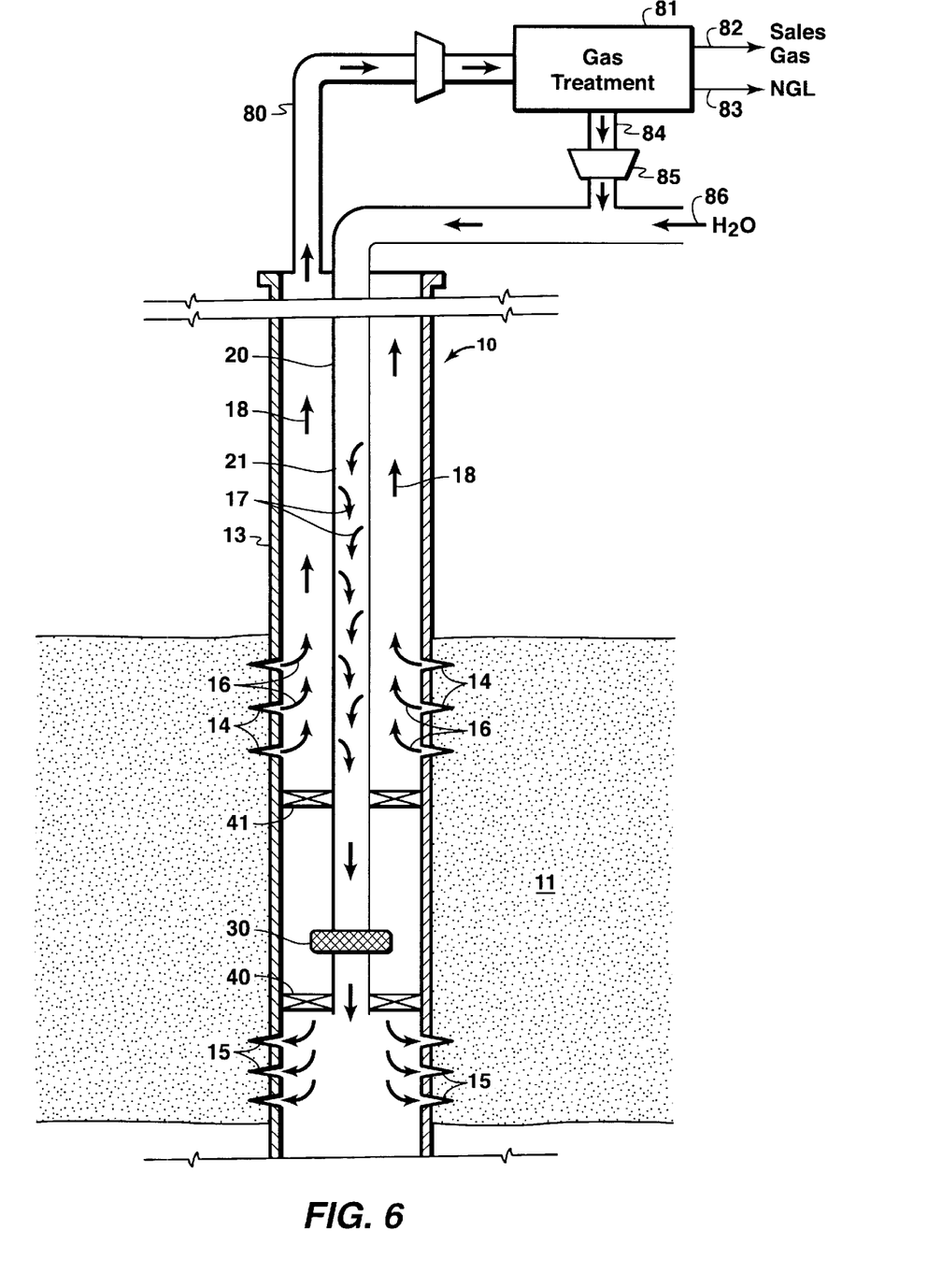
FIG. 6 is a schematic side-elevation sectional view of a third embodiment of the invention showing production of formation gas from an upper region of a formation and injection of waste gas into a lower region of the same formation.

FIG. 6 is a schematic side-elevation sectional view of a third embodiment of the invention which is similar to the embodiment illustrated in FIG. 1 except that the disposal zone is the lower portion of producing zone 11 and a gas or liquid is introduced into the wellbore 10 at the top of the tubing string 20. In this embodiment, retentate gas depleted of $CO_2$ is passed through line 80 to a conventional gas treatment unit 81 which may comprise multiple systems to dehydrate the gas, to remove natural gas liquid, and/or to further sweeten the gas by removing acid gases such as $H_2S$ and $CO_2$. All of these treatment systems are well known. The treatment unit 81 may produce (1) a product stream 82 that is suitable for introduction into a pipeline, fuel line, or it may be passed to a liquefaction plant to produce liquid natural gas (LNG) or pressurized liquid natural gas (PLNG); (2) a natural gas liquid (NGL) stream 83, and (3) a stream 84 enriched in one or more acid gases such as $CO_2$. At least part of stream 84 may be pressurized to a higher pressure by one or more compressors 85 and co-mingled with a pressurized stream of water and introduced into tubing string 20.

As the water/$CO_2$ mixture flows down the tubing string 20, the pressure increases due to the hydrostatic column of fluid. A gas or liquid, such as water, introduced into a wellbore that is pressurized by its hydrostatic head as the gas or liquid flows downhole may be referred to as undergoing "autocompression." The autocompressed gas or liquid injected into the wellbore on the permeate side of the membrane, flowing in a direction countercurrent to the direction of the multi-component fluid on the feed side of the membrane, may be used to reduce the partial pressure of molecules permeating the membrane, thereby increasing the rate of the withdrawal of the permeate stream from the permeate side of the membrane and increasing the driving force for permeation through the membrane. The hydrostatic pressure of the fluid on the permeate side of the membrane must be less than the pressure of fluids on other side of the membrane (the feed side) in order to provide the driving force for permeation of $CO_2$ through the membrane. If it is desired that the downhole fluid pressure within tubing string 20 be higher than that generated by the hydrostatic head, the injection pressure at the wellhead can be increased by means of a pump or compressor (not shown in the drawings).

In addition to obtaining pressure benefits of adding a gas or liquid into the wellbore on the permeate side of the membrane, gas or liquid may also be used to alter the downhole temperature. If the gas or liquid injected into the wellbore is not heated before it is injected, the injected gas or liquid will typically be cooler than the temperature of produced fluids crossing the feed side of the membrane. In some applications, it may be desirable to heat the gas or liquid before it is introduced into the wellbore to increase the temperature of the downhole separation membrane. The heating may be any suitable source, and part of the heating may be obtained by indirect heat exchange with retentate exiting the wellbore.

The autocompressed gas or liquid introduced into the wellbore can also be used to change the density on the permeate side of the membrane. Increasing the density of the permeate can be advantageous in applications in which the permeate comprises unwanted components that require pressurization before being injected into a disposal zone. The compression power required to pressurize the permeate can be reduced by increasing the density of the permeate and lowering the temperature of the permeate. The goal would be to get the permeate to a dense phase state such that a pump could be used instead of a compressor.

The rate of fluid introduced at the wellhead into the tubing string 20 is preferably balanced between the increased efficiency of $CO_2$ removal and pressure recovery versus the volumes of water that is injected into the disposal zone. Injection problems due to relative permeability effects may arise if large volumes of water are injected. Also, the cost of treating the water prior to injection can become substantial if large volumes of water are used.

The pressures exerted by the hydrostatic column within tubing string 20 can be readily calculated by a person skilled in the art. One or more monitors are preferably appropriately located in the wellbore to record the fluid pressures on the feed and permeate sides on the membrane. These monitors could be conventional downhole pressure sensors that give a single point measurement of the feed and permeate pressures or fiber optic sensors that provide a more complete description of the pressure profiles.

It is also possible that hydrates might form in the wellbore, particularly on the permeate side of the membrane if water is used as a sweep fluid. On the one hand, this could be a problem if the hydrates cause plugging or mechanical attrition of the membrane surface. On the other hand, it might be preferable to operate in the hydrate region on the permeate side of the membrane. The presence of hydrates could increase the hydrostatic head of the fluid thereby increasing the amount of autocompression. The formation of hydrates could also reduce the fugacity (or activity) of the $CO_2$ on the permeate side thereby increasing the thermodynamic driving force across the membrane, thereby increasing the efficiency of the separation. The downhole system could be designed so that any hydrates formed would melt before entering pump 30, given the natural increase in temperature at deeper depths.

Two other potential benefits of injecting water as a sweep fluid are (1) the gas/water mixture injected could dissolve carbonates, cements, or other minerals in the near wellbore region to increase injectivity and (2) a corrosion inhibitor can be introduced into the injected water to minimize corrosion risks with the acid gas injection.

Membrane Design

The downhole permeable membrane used in this invention can be of any desired configuration suitable for in-situ application. Thus, the membranes used in the invention may be in composite form, having a separation layer that determines the selectivity and permeability characteristics of the membrane positioned on a porous support layer. Asymmetric-type membranes, in which a relatively dense surface region determines the selectivity and permeability characteristics of the membrane and a more porous region provides support, can also be used. Other forms of membranes, for example, dense membranes can be used for particular applications. The permeable membranes, for purposes of the invention, can be in any desired form sized to fit within the wellbore, such as flat sheet supported by a frame, hollow fiber, spiral wound, or other desired form, with a membrane case in the form of a tube being generally preferred. Whichever membrane material or materials that are used, it will be apparent to those skilled in the art that the membrane operation may be configured in a variety of ways.

The membrane used in the method of the invention preferably has high selectivity for one or more acid gases at a sufficiently high effective permeation rate of the permeate gas per unit surface area. Separation membranes that exhibit a low flux but high selectivity separation are unattractive as they require large separating membrane surface areas. Similarly, separation membranes that exhibit low selective separation but high fluxes are also lacking in practical use feasibility. It would be highly desirable to obtain membranes having high effective permeances as well as high selectivity. However, frequently there is an inverse relationship between the permeation rate of the component (flow) and the selectivity of the membrane to the desired component relative to other components of the gaseous mixture. Membranes used in the process of this invention preferably have a selectivity ratio of the acid gas (for example $CO_2$) to methane (or other light gas) greater than about 10 and more preferably greater than 50, although membranes with selectivity ratios lower than 10 can be used.

It is to be understood that the present invention may be used to separate other components from hydrocarbon streams such as water, $H_2S$, nitrogen, helium, and hydrocarbon components having a molecular weight greater than methane, such as ethane, propane, butane, and pentane.

The invention can be used to reduce the $CO_2$ load of natural gas handling facilities. The invention provides an efficient system for re-injecting produced $CO_2$ for pressure maintenance of hydrocarbon bearing formations and a means for disposing of unwanted $CO_2$ to reduce the environmental impact of producing $CO_2$ to the surface. Thus the present invention results in improved gas handling efficiency.

A person skilled in the art, particularly one having the benefit of the teachings of this patent, will recognize many modifications and variations to the specific embodiment disclosed above. For example, a variety of temperatures and pressures may be used in accordance with the invention, depending on the overall design of the system, the membrane system selected, the desired component separations, and the composition of the feed gas. Additionally, certain process steps may be accomplished by adding devices that are interchangeable with the devices shown. As discussed above, the specifically disclosed embodiment and examples should not be used to limit or restrict the scope of the invention, which is to be determined by the claims below and their equivalents.

What we claim is:

1. A method of separating a multi-component fluid in a wellbore, comprising:
   (a) incorporating in the wellbore at least one fluid separation membrane comprising a feed side and a permeate side;
   (b) passing across the feed side of the membrane at a first pressure a flowing stream of the multi-component fluid obtained from a subterranean producing zone being in fluid communication with the wellbore;
   (c) withdrawing from the feed side a retentate stream depleted in at least one component compared to the multi-component fluid and passing the retentate stream to the earth's surface;
   (d) withdrawing from the permeate side a permeate stream at a second pressure, said permeate stream being enriched in at least one component compared with the multi-component fluid; and
   (e) controlling the second pressure to maintain the second pressure below the first pressure.

2. The method of claim 1 further comprising placement of at least part of the withdrawn permeate into a subterranean disposal zone being in fluid communication with the wellbore.

3. The method of claim 2 wherein the disposal zone has a pressure lower than the producing zone.

4. The method of claim 2 wherein the disposal zone is above the producing zone.

5. The method of claim 2 wherein the disposal zone is part of the producing zone from which the multi-component fluid was produced.

6. The method of claim 5 wherein the disposal zone is the lower portion of the producing zone.

7. The method of claim 2 wherein the permeate is placed into the disposal zone simultaneously with production of the multi-component fluid from the producing zone.

8. The method of claim 2 further comprising controlling the flow rate of the permeate stream into the disposal zone to maintain the second pressure at least 100 psi below the first pressure.

9. The method of claim 2 further comprising the step of boosting the pressure of the withdrawn permeate stream of step (d) by compressing said permeate stream by a pressurization means positioned between the membrane and the disposal zone.

10. The method of claim 9 wherein the pressure of the withdrawn permeate stream is boosted to a value greater than the fluid pressure in the disposal zone.

11. The method of claim 1 further comprising passing at least part of the withdrawn permeate stream to the earth's surface.

12. The method of claim 1 wherein the wellbore contains a plurality of membranes in series for separation of the multi-component fluid.

13. The method of claim 1 wherein the multi-component fluid is natural gas comprising methane and carbon dioxide and the permeate stream is enriched in carbon dioxide.

14. The method of claim 1 wherein the at least one membrane has a selectivity ratio of the carbon dioxide to methane greater than 10.

15. The method of claim 1 wherein the permeate is withdrawn from the permeate side of the membrane in an opposite direction to the direction that the multi-component fluid flows along the feed side of the membrane.

16. The method of claim 1 further comprising the step of monitoring the permeate pressure and the flow rate of the permeate stream.

17. The method of claim 1 further comprising the step of reducing the permeate pressure in response to a differential pressure between the feed pressure and the permeate pressure of less than about 100 psi.

18. The method of claim 1 further comprising the step of reducing the permeate pressure by increasing the rate of withdrawal of the permeate stream from the permeate side of the membrane.

19. The method of claim 1 further comprising the step of contacting the permeate side of the membrane with a non-permeate fluid flowing in the direction that is countercurrent to the direction of flow of the multi-component fluid stream across the membrane.

20. The method of claim 19 wherein the non-permeate fluid is predominantly water.

21. The method of claim 19 further comprising injecting the non-permeate fluid into the top of the wellbore and passing the non-permeate fluid down the wellbore to the permeate side of the membrane.

22. The method of claim 1 wherein the permeate is enriched in hydrogen sulfide.

23. The method of claim 1 wherein the permeate is enriched in $C_{3+}$ hydrocarbons.

24. A method of separating a multi-component fluid in a wellbore in fluid communication with one or more subterranean, fluid-producing zones and one or more disposal zones, comprising the steps of:
   (a) incorporating in the wellbore at least one fluid separation membrane having a feed side in contact with the membrane at a feed pressure and a permeate side at a permeate pressure, said membrane having a retentate stream being withdrawn from the feed side and a permeate stream being withdrawn from the permeate side;
   (b) passing the multi-component fluid from the producing zone to the feed side of the membrane;
   (c) separately removing the permeate stream and the retentate stream from contact with the membrane;
   (d) determining the pressure of the multi-component fluid on the feed side of the membrane and the pressure of the permeate on the permeate side of the membrane;
   (e) determining a pressure differential across the membrane;
   (f) if the pressure differential is less than a desired value, decreasing the pressure of the permeate on permeate side of the membrane; and
   (g) injecting the permeate into one or more disposal zones.

25. The method of claim 24 wherein the multi-component gas is natural gas containing carbon dioxide and the permeate fluid is enriched in carbon dioxide and the retentate fluid is depleted in carbon dioxide.

26. The method of claim 24 further comprising the step of conveying the retentate fluid to the earth's surface.

27. The method of claim 24 further comprising the step of pressurizing the permeate gas to a higher pressure and directing the higher pressure permeate into a subterranean formation below the fluid-producing zone.

28. The method of claim 27 wherein the permeate pressurization is carried out using an electrically-driven submersible pump.

29. The method of claim 27 wherein the permeate pressurization is carried out using a hydraulically-driven submersible pump.

30. The method of claim 27 wherein the permeate pressurization is carried out using a hydraulically-driven eductor.

31. The method of claim 27 wherein the higher-pressure permeate is introduced into a subterranean formation that is fluidically separated from the fluid-production zone.

32. The method of claim 27 wherein the higher-pressure permeate is introduced into a lower portion of the fluid-producing zone of the subterranean formation.

33. The method of claim 24 further comprising the step of conveying the permeate stream to the earth's surface, processing the permeate to remove a waste gas from the permeate, and subsequently injecting at least part of the separated waste gas into a disposal zone.

34. A method of separating a multi-component fluid in a wellbore in fluid communication with a subterranean, fluid-producing zone and a disposal zone, comprising the steps of:
  (a) providing in the wellbore a membrane having a feed side and a permeate side and being selective for one or more components of the multi-component fluid;
  (b) passing the multi-component fluid from the producing zone across the feed side at a feed pressure;
  (c) maintaining a pressure on the permeate side of the membrane lower than the pressure on the feed side of the membrane, thereby yielding a permeate containing increased quantity of the more permeable fluid and decreased quantity of the less permeable fluid and a retentate containing decreased quantity of the more permeable fluid and increased quantity of the less permeable fluid components;
  (d) recovering a retentate stream; and
  (e) disposing of the permeate by injecting it into the disposal zone.

35. A method of disposing of at least one component of a multi-component fluid mixture produced into a fluid-containing subterranean formation penetrated by a wellbore, comprising the steps of:
  (a) separating in the wellbore the multi-component fluid into a first stream rich in at least one component and a second stream depleted of the at least one component, said first and second streams being separated from each other;
  (b) directing to the earth's surface the second stream;
  (c) injecting into the wellbore a third stream comprising and co-mingling the first stream and third stream in the wellbore to produce a co-mingled stream, the hydrostatic head of the third stream providing compression of the co-mingled stream; and
  (d) injecting the co-mingled stream into a subterranean disposal zone penetrated by the wellbore.

36. A method of separating a multi-component gas in a wellbore in fluid communication with a subterranean, gas-bearing formation, comprising the steps of:
  (a) incorporating in the wellbore a gas separation membrane to provide a permeate gas enriched in more readily permeable gas components and a non-permeate gas depleted of the more readily permeable gas components;
  (b) subjecting the gas separation membrane to the multi-component gas;
  (c) withdrawing the non-permeate gas from one side of the membrane and withdrawing permeate gas from the other side of the membrane;
  (d) maintaining the pressure of the permeate on the permeate side of the membrane at a pressure below the feed pressure; and
  (e) placing the permeate stream into the disposal zone.

37. A method of separating a multi-component fluid in a wellbore in fluid communication with a subterranean, fluid-producing zone and a subterranean disposal zone, comprising the steps of:
  (a) incorporating in the wellbore one or more fluid separation membranes having a feed side and a permeate side;
  (b) passing across the membrane on the feed side at a feed side pressure a flowing stream of the multi-component fluid obtained from the producing zone;
  (c) withdrawing from the feed side a retentate stream depleted in at least one component compared to the multi-component fluid;
  (d) withdrawing from the permeate side a permeate stream at a permeate pressure, said permeate stream being enriched in at least one component compared with the multi-component fluid;
  (e) regulating the pressure of the permeate on the permeate side of the membrane at a pressure below the feed pressure;
  (f) passing the retentate stream to a treatment unit outside the wellbore;
  (g) in the treatment unit, separating from the retentate stream one or more non-hydrocarbon components;
  (h) pressurizing the one or more non-hydrocarbon components to a higher pressure;
  (i) co-mingling the pressured non-hydrocarbon components with a pressurized aqueous liquid and introducing the co-mingled mixture into the wellbore;
  (j) passing the co-mingled mixture down the wellbore and across the permeate side of the membrane, thereby causing the permeate to co-mingle with the co-mingle mixture flowing across the permeate side; and
  (k) placing the mixture resulting from step (j) into the disposal zone.

38. The method of claim 37 wherein the one or more non-hydrocarbon components removed in step (g) comprise carbon dioxide.

39. A fluid separation system for installation within a wellbore in fluid communication with a subterranean formation containing a multi-component gas, comprising:
  (a) a membrane separator having a feed side and a permeate side, said membrane separating one or more permeable gas components from one or more less permeable gas components;
  (c) a pressurizing means in the wellbore for receiving permeate gas from the separation membrane and pressurizing the permeate gas to a higher pressure;
  (d) means for conveying the multi-component gas to the feed side of the membrane separator;
  (e) means for conveying the non-permeate gas to the earth's surface as a product stream; and
  (f) means for conveying the permeate gas to the pressurizing means and means for conveying the gas pressurized by the pressurizing means to a discharge zone within the wellbore that is in fluid isolation from the feed side of the separation membrane.

40. A downhole fluid separation system comprising:
(a) a casing having an interval that communicates with a gas producing zone so that gas from the producing zone enters the casing and a gas disposal zone so that waste gas separated from the gas enters the disposal zone;
(b) a seal disposed in the casing wherein the seal is configured to separate the disposed zone from the producing zone;
(c) a tubing string having at least one membrane module incorporated therein, said module having a feed side and a permeate side and being selective for one or more components of the multi-component fluid;
(d) a monitoring device in the wellbore for detecting the pressure of the feed stream and the pressure of the permeate on the permeate side of the membrane; and
(e) a pump for withdrawing gas from the permeate side and pressurizing the permeate gas to a pressure suitable for injection of the pressurized permeate gas into the disposal zone, said pump adjusting or reducing the pressure in response to the monitored and/or sensed pressure in the wellbore.

* * * * *